United States Patent [19]

David

[11] Patent Number: 5,625,812
[45] Date of Patent: Apr. 29, 1997

[54] METHOD OF DATA STRUCTURE EXTRACTION FOR COMPUTER SYSTEMS OPERATING UNDER THE ANSI-92 SQL2 OUTER JOIN PROTOCOL

[76] Inventor: Michael M. David, 2118 Wilshire Blvd., Suite 167, Santa Monica, Calif. 90403

[21] Appl. No.: 339,454

[22] Filed: Nov. 14, 1994

[51] Int. Cl.⁶ .................................................. G06F 17/30
[52] U.S. Cl. .................. 395/602; 364/282.1; 364/283.4; 364/260.9; 364/DIG. 1
[58] Field of Search ...................................... 395/600, 700, 395/650, 500

[56] References Cited

U.S. PATENT DOCUMENTS

| | | | |
|---|---|---|---|
| 4,506,326 | 3/1985 | Shaw | 364/300 |
| 5,049,873 | 9/1991 | Robins | 340/825.06 |
| 5,276,880 | 1/1994 | Platoff | 395/700 |
| 5,367,675 | 11/1994 | Cheng | 395/600 |
| 5,412,804 | 5/1995 | Krishna | 395/600 |
| 5,471,611 | 11/1995 | McGregor | 395/600 |
| 5,475,837 | 12/1995 | Ishak | 395/600 |
| 5,495,604 | 2/1996 | Harding | 395/600 |
| 5,504,885 | 4/1996 | Alashqur | 395/600 |
| 5,511,186 | 4/1996 | Carhart | 395/600 |

*Primary Examiner*—Eric Coleman
*Attorney, Agent, or Firm*—Matthew F. Jodziewicz

[57] ABSTRACT

A method for determining data structure by analyzing an outer join protocol statement used to access the data by sequentially parsing, identifying and storing each token on a push-pop stack. These steps are repeated until a join condition token is identified. The top three data are popped from the push-pop stack and represent a right database root structural node token, a join type token (left or right), and a left database structural root node token. The right and left node structures represented by the popped root node data are linked into one structure using the join type specification and the structural node points specified by the current join condition token. A root node datum representative of the resulting node structure is pushed back onto the push-pop stack. When all tokens have been processed, the node data represented by the resulting root node on the push-pop stack is ordered in accordance with the contained hierarchial data.

12 Claims, 3 Drawing Sheets

METHOD OF DATA STRUCTURE EXTRACTION FOR COMPUTER SYSTEMS OPERATING UNDER THE ANSI-92 SQL2 OUTER JOIN PROTOCOL

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates in general to a method of extracting the hierarchial data structure contained in computer memory for computers operating under ANSI-92 SQL2 outer join protocol.

2. Background of the Invention

Computers have become essential in our modern society for the storage, processing and retrieval of data stored in computer memories. Accordingly, much current research in computer technology is directed to methods designed for the storing and processing of data that are inter-related. These groupings of stored data are commonly known as relational databases and are accessed by the computer's central processing unit operating under a set of instructions such as the ANSI-92 SQL2 protocol and grammar set. The power of such relational databases lies in their flexibility to store data as separate normalized tables which are free to be related in any way necessary for each application accessing the data held in the computer's storage. The relational join operation is the mechanism used in SQL relational databases to perform the relating and combining of multiple tables into a single result table or result set for additional processing by the central processing unit by additional relational operation or the application.

The method of associating stored data and determining the interrelationships thereamong is therefore one of the most important relational operations capable of being performed by a processor on stored data.

However, current methods of building or generating the data structure, such as that known as a "inner join" in SQL protocols, have resulted in problems such as lost data, data redundancy, lack of data modeling capability and loss of data structure for such stored data. These problems cause inefficiency and inaccuracy in the use of the computer system's available storage space for holding and processing data stored in the computer's memory.

The first problem, that of lost data, is caused by the way the standard SQL inner join protocol processes unmatched rows of stored data in the computer memory. For a row of a participating table in a join operation to be included in the result, it must be matched with at least one row from each of the other participating tables of data stored in the computer. This means that one occurrence of a missing row from any one table can result in lost data from all the other tables participating in the inner join operation.

Another serious problem is that of data redundancy where data being stored in the computer memory is duplicated in several locations lessening the overall accuracy of the computer system to store data. There are two main causes for redundant data. The first occurs when the resulting table or working set, produced from joining multiple tables, is forced back into a flat, two-dimensional table result. When a row from one table is matched with multiple rows in another participating table, the single matching row must be replicated to match the multiple rows from the participating table. This will force the resulting table or working set back into a flat table structure.

Flat table structures are necessary to comply with conventional relational databases' first normal form requirement. The first normal form requirement requires one, and only one, occurrence of each data field in every row of a table or result to be present.

The second cause of redundant data occurs when it is generated by a Cartesian product effect (data explosion). In this case, two or more rows with the same join field values from one table are joined with two or more rows of another table. Since the join field values are the same, each row from one table is joined with each matching row from the other table resulting in all combinations being joined and placed in the result.

The last two join related problems, i.e., lack of data modeling and loss of data structure, occur when the same tables joined using the same interrelationships can be modeled or viewed in more than one way. These last two problems can result in serious consequences in causing the data stored in the memory unit to become inaccurate for processing and retrieval under the desired data structure under which it was stored for processing by the central processing unit.

Because of the non-procedural and powerful nature of SQL, hierarchical data structures are the most useful since they have the greatest flexibility while having unambiguous semantics. This is because there is only one path to each table.

OBJECTS AND SUMMARY OF THE INVENTION

Accordingly, it is an object of the present invention to provide a method of controlling the central processing unit of a computer system for extracting the hierarchial data structure stored in computer memory for computers operating under ANSI-92 SQL2 outer join protocol.

It is still another object of the present invention to provide a method for controlling a central processing unit of computers operating under ANSI-92 SQL2 outer join protocol for relational database processing that controls lost and replicated data among the data stored in a computer's memory or storage unit to increase accuracy and efficiency of the central processing unit's operation.

It is yet another object of the present invention to provide a method of controlling the central processing unit of a computer system for extracting the hierarchial data structure stored in computer memory for computers operating under ANSI-92 SQL2 outer join protocol that permits data modeling of the data stored in the computer's memory or storage unit.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

A preferred method embodying the present invention is now described with reference to FIGS. 1 and 2.

Figure 2:
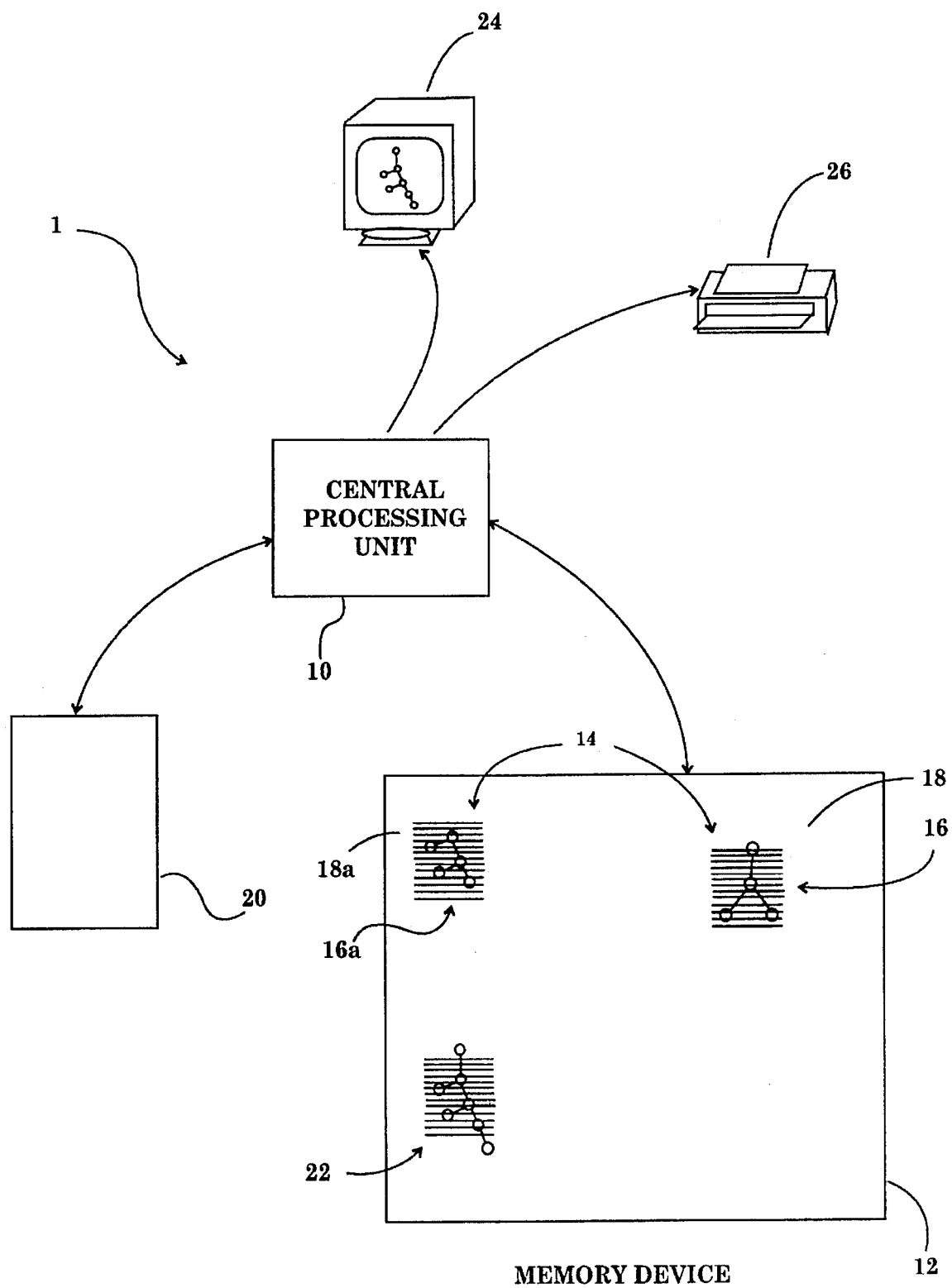
FIG. 2 is an idealized block schematic showing the interaction of the central processing unit operating on data stored in the computer system's storage device to extract the hierarchical data structure of the stored data; and, FIG. 3 is a flowchart showing logic flow through the linking steps of a method embodying the present invention.

FIG. 2 shows that the present invention provides a method of operation in a computer system 1 having a central processing unit 10 coupled with a memory storage device 12 containing data 14 stored in at least one normalized, relational database, but as many databases 16, 16a, as needed or stored. Each database would include a plurality of data having a known hierarchial data structure 18, 18a, respectively, capable of being represented in a protocol equivalent to the ANSI-92 SQL2 outer join grammar. The central processing unit 10 of the system 1 operates in accord with a programmed set of operating instructions having a protocol equivalent to the ANSI-92 SQL2 outer join grammar for the processing of data 14 stored in the computer's memory device 12. A method embodying the present invention of controlling the central processing unit 10 uses the outer join ANSI-92 SQL2 protocol to create and store data representing a resultant database structure 22 in the computer's memory unit 14, such as RAM or more static memory devices, having a known hierarchial data structure for the stored data 14 that is represented by an outer join protocol statement. Central Processing Unit 10 allocates, either internally in registers, or externally in the memory device 12, a push-pop working stack 20 for analyzing and determining the data structure. (Equivalents of push-pop working stack 20 are also included in the invention, such as recursive routines performing the same function.) The outer join protocol statement can be user or program selected or generated to reflect the desired data interrelationship that is to be processed by the central processing unit 10.

Central Processing Unit 10 can store the resultant database structure 22 in memory device 12, or display it on a video display terminal 24 or send it to a printer 26 as required.

Figure 1:
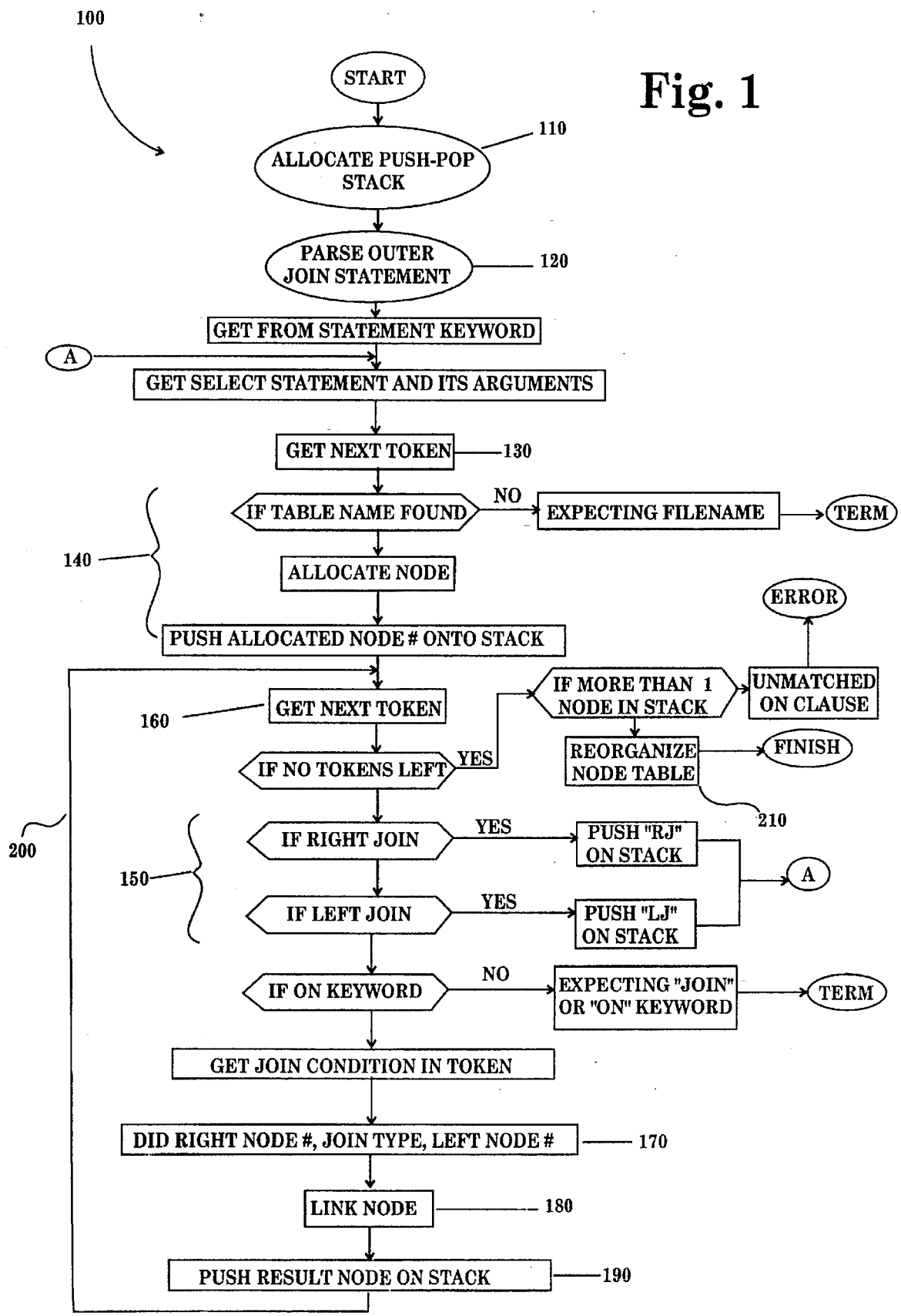
FIG. 1 is a flowchart showing logic flow through a method embodying the present invention.

A method 100 embodying the present invention comprises the following steps described below and whose logic flow is illustrated in FIG. 1.

(a) First the central processing unit creates and allocates 110 an area in the memory storage device as a push-pop stack. A push-pop stack may also be allocated in the central processing unit itself using available register structures if there are a sufficient number available.

(b) The central processing unit now parses 120 the outer join protocol statement into a plurality of tokens for execution by the central processing unit in accord with the grammar, syntax and semantics, of ANSI-92 SQL2 outer join protocol for controlling the actions of the central processing unit. These tokens may be stored for later use as indicated below in the memory of the computer and retrieved when needed by the central processing unit.

(c) The tokens from the parsed outer join statement are individually parsed in a sequential manner 130 to identify if the token being parsed is a table name, join type (left or right), or a join condition as specified by the protocol grammar, syntax and semantics.

(d) If the token being parsed is identified as a table name, the central processing unit pushes 140 a new root structural node datum with table name onto the push-pop stack and parses 160.

(e) If the token being parsed by the central processing unit is identified as a left or right join type token respectively, the central processing unit pushes 150 a join type datum representative of a left or right join type token onto the push-pop stack.

(f) The central processing unit now repeats steps (c) to (e) until the token being parsed by the central processing unit is identified as a join condition token as specified by the protocol grammar, syntax and semantics under which the central processing unit is operating.

(g) The central processing unit now pops 170 the top three data items from the push-pop stack. In the order popped, these top three data items represent a right database root structural node token, a join type token (left or right), and a left database structural root node token.

Figure 3:
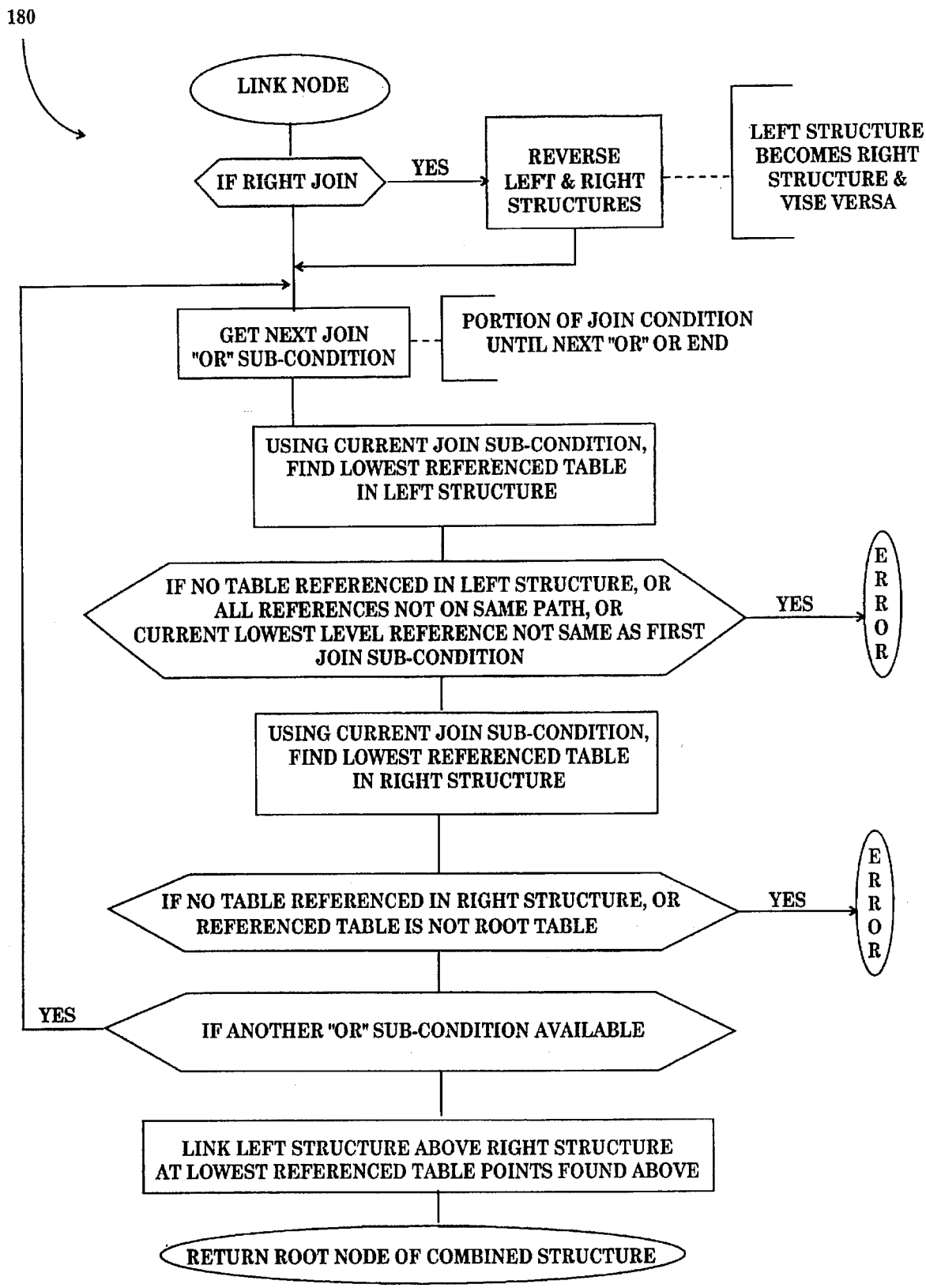

(h) The central processing unit links the right and left node structures 180 represented by the popped root node data into one structure at the structural node points specified by the current join condition token. See FIG. 3 for an expanded logic flow through block 180 of FIG. 1. The lowest level tables referenced from the join condition in the left and right structures are the structural link node points. The popped join type (right or left) literally specifies which substructure assumes the higher level position of the combined structure.

(i) The central processing unit now pushes 190 a root node datum representative of the resulting node structure back onto the push-pop stack in the memory means.

(j) The central processing unit repeats 160 and above steps (e) through (i) until all tokens from the outer join statement have been processed.

(k) The central processing unit orders 210 the node data represented by the resulting root node on the push-pop stack in accordance with the hierarchial data structure it contains (to increase its ease of use) and stores the ordered node data in its memory for later use or analysis.

A method embodying the present invention would also embody a step of having the central processing unit display the ordered node data held in its memory on a display terminal, or of printing the ordered node data in its memory on a printer.

Various implementations and uses of this method are possible, including, but not limited to the following:

(1) Disparate heterogeneous database access: By automatically obtaining knowledge of the database structure being accessed, relational database systems can navigate hierarchial non-relational databases without requiring the pre-definition of an externally defined data structure. This has many additional advantages, such as, dynamic and transparent data structure specification which also insures that the database structure exactly matches the outer join specification being processed. This also makes this interface seamless since the SQL syntax and semantics are still operating as defined.

(2) Nested relational database access: By using the data structure derived from outer joins, standard first normal form relational database systems can access their data in nested relational form, giving the advantages of nested relational access (operating directly on data structures) with the additional advantage of maintaining data independence. Again there is the further advantage that the data structure does not require being pre-defined, making it dynamic and giving it data structure independence which is also transparent.

(3) Optimizations: Utilizing the semantics of the derived hierarchical data structure, many powerful semantic optimizations can be performed. These include, but are not limited to:

i) removing unnecessary tables from views by utilizing optimizations identified in the universal relation theory;

ii) the outer join specification can be reordered and simplified to be more efficient and easier to process;

iii) parallel processing can take advantage of the hierarchical structure to perform more efficient levels of pipelining (building the next tuple before the current tuple is complete);

iv) dynamic path shortening for greater efficiency of operation of the central processing unit.

(4) Value added functionality: These are additional capabilities that standard first normal form relational database systems can utilize by having knowledge of the data structure being accessed.

i. Because of the unambiguous semantics associated with hierarchical data structures, join view (multi-table) updates can be updated intelligently and unambiguously.

ii. Outer join specifications with ambiguous data structures can be detected and the appropriate corrective action can be undertaken.

iii. Valid SQL syntax usage that will produce incorrect results based on the data structure can also be detected.

iv. Certain SQL syntax restrictions can be relaxed because they will become meaningful in light of the data structure being accessed.

(5) Open database access interface: Because the outer join is flexible, has inherent data structure processing ability, and is standardized, it makes an excellent open database access interface. The method of the present invention can enhance this level of database structure processing, inducing many SQL tool and utility software companies to use the outer join as an access interface that carries the data structure along with it. These database tools and utilities on the receiving end the outer join database request will use the method of the present invention to extract the data structure. This eliminates the need for them to define and pass the data structure information as an additional and non-standardized step.

(6) Relational ODBMS interface: Having a relational database interface to ODBMS is highly desirable, but because of relational database limitations they are lacking in many required ODBMS capabilities. Using the method of the present invention, many of these capabilities can be added. Database navigational information can be supplied to the ODBMS in the form of the database structure. This is supplied at run time, enabling late binding which allows the data structure to be selected or specified at run time. This in turn helps support polymorphism (the overdefining of functions). These are very important features of ODBMS that are not found in relational databases.

(7) Information Warehouse interface: Information (or data) warehouses are databases that store all long term data that is no longer required in the production database, but is still very important as historical data. This historical data will need to be combined in very unpredictable ways and in an interactive manner. The standardized ANSI-92 SQL2 outer join operation controlling a central processing unit managing stored data can utilize the method of the present invention to supply the information warehouse database access engine with interactively obtained database modeling and navigational information.

(8) Reverse engineering: The method of the present invention can be used in deriving the data structure of outer join specifications for reverse engineering purposes. These uses include, but are not limited to, data modeling tools, re-engineering tools and debugging tools. These tools use the data structure information supplied by the method of the present invention to help understand the operation of the outer join specification for applications that do not apply this knowledge back to the direct execution of the outer join and usually contain interaction with a user.

The present invention has been implemented in a computer architecture having a central processing unit connected to a storage unit containing a number of databases for processing through the central processing unit in accord with an ANSI-92 SQL2 grammar and protocol set. Optimization of the central processing unit was noted by operation cycles saved between performing the same request both with and without the invention.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A computer system using the ANSI-92 SQL2 outer join protocol for manipulating data contained in the computer system to create and store a resultant database having a known hierarchial data structure represented by an outer join protocol statement, the computer system comprising:

a) a central processing unit coupled with a first memory storage means containing at least a first normalized, relational database, each database in said first storage means including a plurality of data having a known hierarchial data structure capable of being represented in a protocol equivalent to ANSI-92 SQL2 outer join grammar, said central processing unit operating in accord with a programmed set of instructions having a protocol equivalent to ANSI-92 SQL2 outer join grammar;

b) second memory means coupled to said central processing unit having a push-pop stack area and a storage area for nodes;

c) said first memory means further containing a set of instructions for controlling said central processing unit to execute the following steps:

(i) parsing the outer join protocol statement into a plurality of tokens for execution by said central processing unit in accord with the grammar, syntax and semantics, of ANSI-92 SQL2 outer join protocol for controlling the actions of said central processing unit;

(ii) parsing sequentially said tokens from the outer join statement to identify if the token being parsed is a table name, join type (left or right), or a join condition;

(iii) pushing a new root structural node datum with table name onto said push-pop stack in said second memory means as a data item if the token being parsed is identified as a table name;

(iv) pushing a join type datum representative of a left or right join type token onto said push-pop stack in said second memory means as a data item, if the token being parsed is identified as a left or right join type token respectively;

(v) repeating steps (ii) to (iv) until the token being parsed is identified as a join condition token;

(vi) popping the top three data items from said push-pop stack in said second memory means representing a right database root structural node token, a join type token (left or right), and a left database structural root node token;

(vii) linking the right and left node structures represented by the popped root node data into one structure at the structural node points specified by the current join condition token where the lowest level table referenced from said join condition in left and right structures are the link node points and the popped join type (right or left) specifies which substructure assumes the higher level position of the combined structure;

(viii) pushing a root node datum representative of the resulting node structure back onto said push-pop stack in the second memory means;

(ix) repeating steps (ii) through (viii) until all tokens from the outer join statement have been processed; and, (x) ordering the node data represented by the resulting root node on said push-pop stack in the second memory means in accordance with the hierarchial data structure and storing the ordered node data in said first memory means.

2. The method of claim 1 further including:
a display terminal connected to said central processing unit for displaying the ordered node data in said first memory means.

3. The method of claim 1 further including:
a printer connected to said central processing unit for printing the ordered node data in said first memory means.

4. In a computer system having a central processing unit coupled with a memory storage means containing at least a first normalized, relational database, each database in said storage means including a plurality of data having a known hierarchial data structure capable of being represented in a protocol equivalent to ANSI-92 SQL2 outer join grammar, the central processing unit operating in accord with a programmed set of instructions having a protocol equivalent to ANSI-92 SQL2 outer join grammar, a method of controlling the central processing unit by using the outer join ANSI-92 SQL2 outer join protocol to create and store a resultant database in the memory means having a known hierarchial data structure represented by an outer join protocol statement, comprising the steps of:

(a) allocating a push-pop stack area in the memory storage means;

(b) parsing the outer join protocol statement into a plurality of tokens for execution by the central processing unit in accord with the grammar, syntax and semantics, of ANSI-92 SQL2 outer join protocol for controlling the actions of the central processing unit;

(c) parsing sequentially said tokens from the outer join statement to identify if the token being parsed is a table name, join type (left or right), or a join condition;

(d) pushing a new root structural node datum with table name onto the push-pop stack as a data item if the token being parsed is identified as a table name;

(e) pushing a join type datum representative of a left or right join type token onto the push-pop stack as a data item, if the token being parsed is identified as a left or right join type token respectively;

(f) repeating steps (c) to (e) until the token being parsed is identified as a join condition token;

(g) popping the top three data items from the push-pop stack representing a right database root structural node token, a join type token (left or right), and a left database structural root node token;

(h) linking the right and left node structures represented by the popped root node data into one structure at the structural node points specified by the current join condition token where the lowest level table referenced from said join condition in left and right structures are the link node points and the popped join type (right or left) specifies which substructure assumes the higher level position of the combined structure;

(i) pushing a root node datum representative of the resulting node structure back onto the push-pop stack in the memory means;

(j) repeating steps (c) through (i) until all tokens from the outer join statement have been processed; and, (k) ordering the node data represented by the resulting root node on the push-pop stack in the memory means in accordance with the hierarchial data structure and storing the ordered node data in the memory means.

5. The method of claim 4 further including the step of:
displaying the ordered node data in the memory means on a display terminal.

6. The method of claim 4 further including the step of:
printing the ordered node data in the memory means on a printer.

7. The method of claim 4 wherein said step of parsing the ANSI-92 SQL2 outer join protocol statement into a plurality of tokens further includes the step of:
storing said plurality of tokens in the memory means.

8. In a computer system having a central processing unit coupled with a memory storage means containing at least a first normalized, relational database, each database in said storage means including a plurality of data having a known hierarchial data structure capable of being represented in a protocol equivalent to ANSI-92 SQL2 outer join grammar, the central processing unit operating in accord with a programmed set of instructions having a protocol equivalent to ANSI-92 SQL2 outer join grammar, a method of controlling the central processing unit by using the outer join ANSI-92 SQL2 outer join protocol to create and store a resultant database in the memory means having a known hierarchial data structure represented by an outer join protocol statement, comprising the steps of:

(a) allocating a push-pop stack area in the memory storage means;

(b) parsing sequentially said tokens from the outer join statement to identify if the token being parsed is a table name, join type (left or right), or a join condition;

(c) pushing a new root structural node datum with table name onto the push-pop stack as a data item if the token being parsed is identified as a table name;

(d) pushing a join type datum representative of a left or right join type token onto the push-pop stack as a data item, if the token being parsed is identified as a left or right join type token respectively;

(e) repeating steps (b) to (d) until the token being parsed is identified as a join condition token;

(f) popping the top three data items from the push-pop stack representing a right database root structural node token, a join type token (left or right), and a left database structural root node token;

(g) linking the right and left node structures represented by the popped root node data into one structure at the structural node points specified by the current join condition token where the lowest level table referenced from said join condition in left and right structures are the link node points and the popped join type (right or left) specifies which substructure assumes the higher level position of the combined structure;

(h) pushing a root node datum representative of the resulting node structure back onto the push-pop stack in the memory means;

(i) repeating steps (b) through (h) until all tokens from the outer join statement have been processed; and, (j) ordering the node data represented by the resulting root node on the push-pop stack in the memory means in accordance with the hierarchial data structure and storing the ordered node data in the memory means.

9. The method of claim 8 further including the step of:

parsing the outer join protocol statement into a plurality of tokens for execution by the central processing unit in accord with the grammar, syntax and semantics, of ANSI-92 SQL2 outer join protocol for controlling the actions of the central processing unit.

10. The method of claim 8 further including the step of:

displaying the ordered node data in the memory means on a display terminal.

11. The method of claim 8 further including the step of:

printing the ordered node data in the memory means on a printer.

12. The method of claim 8 wherein said step of parsing the ANSI-92 SQL2 outer join protocol statement into a plurality of tokens further includes the step of:

storing said plurality of tokens in the memory means.

* * * * *